United States Patent [19]

Itou et al.

[11] Patent Number: 5,605,548
[45] Date of Patent: Feb. 25, 1997

[54] MANUFACTURING METHOD FOR A POLYMER SOLID ELECTROLYTE CELL WHICH USES COMPOSITE POSITIVE ELECTRODE

[75] Inventors: Tsukasa Itou, Sumoto; Masato Nishioka, Ibaraki; Takashi Oda, Sumoto; Tsutomu Sonozaki, Mihara-gun; Yasunobu Kodama, Sumoto, all of Japan

[73] Assignee: Sanyo Electric Co., Ltd., Osaka, Japan

[21] Appl. No.: 561,286

[22] Filed: Nov. 21, 1995

[30] Foreign Application Priority Data

Nov. 21, 1994 [JP] Japan ................................. 6-286733

[51] Int. Cl.$^6$ ............................ H01M 4/04; H01M 10/38
[52] U.S. Cl. ........................ 29/623.1; 29/623.5; 429/192
[58] Field of Search ............................. 29/623.1, 623.5; 429/192, 212; 419/10, 43; 264/104, 105, 134, 347, 271.1, 272.21, 273, 279, 291

[56] References Cited

U.S. PATENT DOCUMENTS 5,362,493  11/1994  Skotheim et al. ..................... 429/194
5,384,213  1/1995  Olsen ..................................... 429/192

FOREIGN PATENT DOCUMENTS 5-109310  4/1993  Japan .

*Primary Examiner*—Anthony Skapars
*Attorney, Agent, or Firm*—Armstrong, Westerman, Hattori, McLeland & Naughton

[57] ABSTRACT

A quick and simple manufacturing method for a current collector single body sheet-like composite positive electrode of superior electrode performance includes a positive electrode mixture generating process mixing non-aqueous solvent, polymer material, electrolyte salt, positive electrode active material and electrically conductive material, a positive electrode mixture pressing out process after the mixture has been applied onto the positive electrode current collector and a process for hardening the sheet-like electrode, at a same time attaching the sheet-like electrode to the positive electrode current collector using heat or ionizing radiation to polymerize the polymer material distributed in the mixture. An efficient manufacturing method for a polymer solid electrolyte cell of superior cell capacity and cell characteristics which uses said composite positive electrode additionally includes a process for arranging a polymer solid electrolyte precursor on a negative electrode, a process for arranging a current collector single body composite positive electrode on the electrolyte precursor on the surface of the negative electrode so that the positive and negative electrodes face each other with electrolyte precursor in-between, and a process for hardening the electrolyte precursor to form a polymer solid electrolyte film, at a same time attaching said film to the positive electrode by using heat or ionizing radiation to polymerize the polymer solid electrolyte precursor.

15 Claims, 3 Drawing Sheets

MANUFACTURING METHOD FOR A POLYMER SOLID ELECTROLYTE CELL WHICH USES COMPOSITE POSITIVE ELECTRODE

BACKGROUND OF THE INVENTION

1. Field of the Invention

The present invention relates to a manufacturing method for a current collector single body sheet-like composite positive electrode which is a component in a polymer solid electrolyte cell and to a manufacturing method for a polymer solid electrolyte cell which uses said current collector single body sheet-like composite positive electrode.

2. Related Art

In general, a distinction is made between liquid electrolyte-type cells which use a liquid electrolyte and solid electrolyte-type cells which use a solid electrolyte.

Within the two classifications, there is a greater number of possible electrolyte substances for liquid electrolyte-type cells. This has led to greater advances in the development and use of such liquid electrolyte-type cells over solid electrolyte-type cells. However, when liquid electrolytes-type cells are used over a long period, there have been the problems of loss of electrolyte due to evapotranspiration and leaking of electrolyte which reduce the efficiency of the cell, with the latter problem having a further drawback in that leaking electrolyte can damage electronic equipment.

On the other hand, while the limited number of electrolyte substances has hindered the development of solid electrolyte-type cells, such cells do not suffer from the problems of decline in performance due to the loss of electrolyte through evapotranspiration or due to the leaking of the electrolyte (which can damage electronic equipment), in addition to having a further advantage of enabling reductions in both the size and weight of cells. As more portable electronic equipment, such as portable telephones and personal computers, has been developed, attention has been focussed on the use of these cells as a power source or as memory back-up cells, with lithium solid electrolyte-type secondary cells being noted in recent years for their high voltage and high energy density.

These lithium solid electrolyte-type secondary cells are generally constructed of a sheet-like negative electrode made of lithium metal, a sheet-like composite positive electrode made with a lithium compound as the active material in the positive electrode and a polymer solid electrolyte film positioned between the two electrodes as their power generation elements, with a positive and a negative current collector being formed on the outside of these elements. Out of these, it is the sheet-like composite positive electrode which is the power generation element with the greatest effect on the performance of the cell, so that in order to improve the performance of such electrodes, techniques for the combining of electrically conductive material, polymer solid electrolyte and non-aqueous solvent which are added to the active material in the positive electrode have already been developed. Here, techniques, such as the dispersion or dissolution of each material in a volatile solvent, the application of this solvent on electrodes and on flat plates by means of a screen coating method or a doctor blade method and then the removal of excess solvent by means of an evapotranspiration method, have been used as methods for forming sheets in the manufacturing process of these sheet-like composite positive electrodes.

However, for such conventional manufacturing methods, there has been coagulation of the dispersion materials, such as the active material and the conductive material, or of the dissolved material, such as the polymer solid electrolyte material, during solvent removal process. As a result, sheets produced by such methods suffer from an unequal dispersion of all of the materials, so that these sheet-like composite positive electrodes suffer from insufficient interaction between the materials, making it impossible to achieve the desired electrode performance.

As a further problem in conventionally manufactured electrodes, there has been insufficient electrical contact between the positive electrode and the current collector or between the polymer electrolyte film and the positive electrode, so that this too has prevented the realization of optimal performance of the electrodes.

Finally, since conventional manufacturing methods are methods for the applying of a volatile solvent into which the materials are dispersed or dissolved onto the flat plate, it becomes necessary to delicately adjust the viscosity of the solution, as well as to consider the prevention of any danger to workers when removing the solvent, meaning that such manufacturing methods are highly problematic.

SUMMARY OF THE INVENTION

It is a primary object of the present invention to provide a manufacturing method for a current collector single body sheet-like composite positive electrode which can quickly and easily manufacture a sheet-like composite positive electrode of superior electrode characteristics and to provide a manufacturing method for a polymer solid electrolyte cell which includes the sheet-like composite positive electrode manufactured by said process, said manufacturing method being able to efficiently manufacture polymer solid electrolyte cells of superior cell capacity and superior cycle characteristics.

These objects can be achieved by a manufacturing method for a current collector single body sheet-like composite positive electrode where a sheet-like composite positive electrode, including a positive electrode active material, is formed on a positive electrode current collector so as to constitute a single body with the positive electrode current collector, said method comprising: generation of positive electrode mixture process for generating a positive electrode mixture by mixing a non-aqueous solvent, a polymer material, an electrolyte salt, the positive electrode active material and an electrically conductive material; expanded sheet conversion process for expanding the positive electrode mixture after the generated positive electrode mixture has been applied onto the positive electrode current collector; and hardening/attachment process for hardening a sheet-like composite positive electrode and at a same time attaching the sheet-like composite positive electrode to the positive electrode current collector by polymerizing the polymer material distributed in the generated sheet-like positive electrode mixture by applying one of heat and ionizing radiation to the sheet-like positive electrode mixture.

These objects can also be achieved by a manufacturing method for a polymer solid electrolyte cell constructed from a sheet-like composite positive electrode, a sheet-like negative electrode, a current-collector and a polymer solid electrolyte film disposed between the positive electrode and negative electrode, said method comprising: expanded sheet conversion process for arranging a positive electrode formation mixture, including a positive electrode active material, an electrically conductive material and a polymer solid electrolyte precursor made up of a non-aqueous solvent, a polymer material and an electrolyte salt, on a positive electrode current carrying board and converting said mixture into a sheet-like mixture by applying pressure, such as by rolling; hardening/attachment process for hardening the sheet-like mixture and at a same time attaching the sheet-like mixture to the positive electrode current collector by polymerizing the polymer material distributed in the generated sheet-like mixture by application of one of heat and ionizing radiation; negative electrode processing process for arranging the polymer solid electrolyte precursor made up of the non-aqueous solvent, the polymer material and the electrolyte salt on a surface of the sheet-like negative electrode; electrode layer-building process for arranging a current collector single body sheet-like composite positive electrode manufactured in the hardening/attachment process on top of the polymer solid electrolyte precursor arranged on the surface of the sheet-like negative electrode so that the positive electrode and negative electrode face each other with a layer of the polymer solid electrolyte precursor in-between; and cell assembly process font hardening the polymer solid electrolyte precursor so as to form a polymer solid electrolyte film, at a same time attaching the polymer solid electrolyte film to the positive electrode by polymerizing the polymer solid electrolyte precursor by applying one of heat and ionizing radiation to the Layer of the polymer solid electrolyte precursor in a layer-built electrode structure manufactured in the electrode layer-building process.

For the manufacturing method of claim 1, a positive electrode forming mixture including a polymer material is first prepared, with this positive electrode forming mixture then being spread onto the current collector and expanded into sheet-like form, before the polymer material in the positive electrode forming mixture is polymerized by the application of heat or ionizing radiation, so that the mixture hardens to form a sheet-like mixture.

Here, the polymer material used in the generation of positive electrode mixture process may be an ester acrylate derivative. During the generation of positive electrode mixture process, a proportion of the polymer material may fall within a range of 5% to 20% by weight of the mixture. The ester acrylate derivative used in the generation of positive electrode mixture process may be at least one of: polyethylene glycol monoacrylate (see chemical equation 1) which can have a lower alkyl group in an α rank of the acryloyl group, polyethylene glycol diacrylate (see chemical equation 2) which can have a lower alkyl group in an α rank of the acryloyl group, and glycerol tris (acryloyl oxypolyethoxy) ether (see chemical equation 3) which can have a lower alkyl group in an α rank of the acryloyl group.

By means of the above construction, a superior sheet-like composite positive electrode in which there is an even distribution of all of the component materials can be achieved by simple processes such as mixing, spreading, pressing out, and heating or irradiation. Furthermore, the sheet-like composite positive electrode can be firmly attached to the current collector at the same time as when the sheet-like composite positive electrode hardens, thereby producing a current collector single body sheet-like composite positive electrode. A current collector single body sheet-like composite positive electrode produced in this way exhibits favorable electrical contact between the current collector and the sheet-like composite positive electrode, meaning that the current collecting efficiency can be improved which improves the performance of the positive electrode as a whole.

Since for the present invention, the positive electrode forming mixture is expanded into sheet-like form using a roller or similar pressure-applying device, it is not necessary to adjust the viscosity of the positive electrode forming mixture using a solvent, as is the case with screen coating or doctor blade methods. Therefore a great reduction can be made in the amount of solvent used for dispersing the materials, so that the removal of the volatilization of the solvent after the positive electrode forming mixture has been applied to the current collector is no longer necessary.

Accordingly, in addition to the improved operation, there is also the benefit of overcoming the problems with convention techniques wherein solvent removal processes caused coagulation between the dispersed materials and the dissolved materials, leading to an uneven distribution. This is to say, the materials in the positive electrode forming mixture are evenly mixed, so that a sheet with an even distribution of materials can be achieved.

Also, since the kind of polymer material used and the amount to be used are set appropriately, then it is possible to adjust the strength and flexibility of the sheet by adjusting the degree of polymerization by controlling the amount of heat or ionizing radiation. Accordingly, it is relatively simple to produce a sheet-like composite positive electrode which has the desired physical properties, for example, a current collector single body sheet-like composite positive electrode for use in a cell having a spiral construction.

In this way, by means of the present invention, a current collector single body sheet-like composite positive electrode with an even distribution of each of the composite materials and favorable electrical connections can be achieved by a very workable method. Since the materials in a positive electrode manufactured in this way organically interact with one another, there is an effective increase in the area of the electrode which contributes to the electrochemical reaction of the cell. This results in an improvement in the electrical capacity of the positive electrode.

Also, since the mechanical properties of the sheet-like composite positive electrode can be easily changed by adjusting the amount of heat or ionizing radiation, then it is possible to manufacture a current collector single body sheet-like composite positive electrode for a different use without changing the construction step of the positive electrode or the production line.

For the manufacturing method of a positive electrode in claim 6, the generation of positive electrode mixture process in claim 1 is made up of a step for manufacturing a polymer solid electrolyte precursor formed by dissolving the polymer material and the electrolyte salt in the non-aqueous solvent and a step for mixing the manufactured polymer solid electrolyte precursor with the positive electrode active material and the electrically conductive material. Here also, the polymer material used in the generation of positive electrode mixture process may be an ester acrylate derivative. During the generation of positive electrode mixture process, a proportion of the polymer material may fall within a range of 5% to 20% by weight of the mixture. The ester acrylate derivative used in the generation of positive electrode mixture process may be at least one of: polyethylene glycol monoacrylate (see chemical equation 1) which can have a lower alkyl group in an α rank of the acryloyl group, polyethylene glycol diacrylate (see chemical equation 2) which can have a lower alkyl group in an α rank of the acryloyl group, and glycerol tris (acryloyl oxypolyethoxy) ether (see chemical equation 3) which can have a lower alkyl group in an α rank of the acryloyl group.

By dissolving the polymer material and the electrolyte salt beforehand in the non-aqueous solvent and then mixing the other materials with this polymer solid electrolyte precursor, it is possible to mix all of the materials evenly and so obtain a positive electrode with a favorable microstructure in which the polymer solid electrolyte, the positive electrode active material and the electrically conductive material are evenly mixed. This means that electrode performance can be somewhat improved.

For the manufacturing method for a polymer solid electrolyte cell of claim 11, a polymer solid electrolyte precursor is arranged onto the surface of a sheet-like negative electrode, and this is then arranged on the current collector single body sheet-like composite positive electrode so that the pair of electrodes face each other, before polymerization by applying heat or ionizing radiation. Here, the polymer material used in the expanded sheet conversion process may be an ester acrylate derivative. During the expanded sheet conversion process, a proportion of the polymer material may fall within a range of 5% to 20% by weight of the mixture. The ester acrylate derivative used in expanded sheet conversion process may be at least one of: polyethylene glycol monoacrylate (see chemical equation 1) which can have a lower alkyl group in an $\alpha$ rank of the acryloyl group, polyethylene glycol diacrylate (see chemical equation 2) which can have a lower alkyl group in an $\alpha$ rank of the acryloyl group, and glycerol tris (acryloyl oxypolyethoxy) ether (see chemical equation 3) which can have a lower alkyl group in an $\alpha$ rank of the acryloyl group.

By means of this manufacturing method, the assembly of the cell can be performed at the same time as the formation of the polymer solid electrolyte film, meaning that the cell assembly process is extremely efficient. As a result, since the cell can be manufactured extremely efficiently, this means a reduction in the cost of such polymer solid electrolyte cells can be made.

The polymer solid electrolyte film can also be firmly attached to the positive electrode and the negative electrode. This leads to improvements in the electrical contact between the surfaces of the electrodes with the polymer solid electrolyte film, and a corresponding improvement in the performance of the cell, especially with its cycle characteristics.

BRIEF DESCRIPTION OF THE DRAWINGS

These and other objects, advantages and features of the invention will become apparent from the following description taken in conjunction with the accompanying drawings which illustrate a specific embodiment of the invention. In the drawings.

DESCRIPTION OF THE PREFERRED EMBODIMENTS

Figure 1:
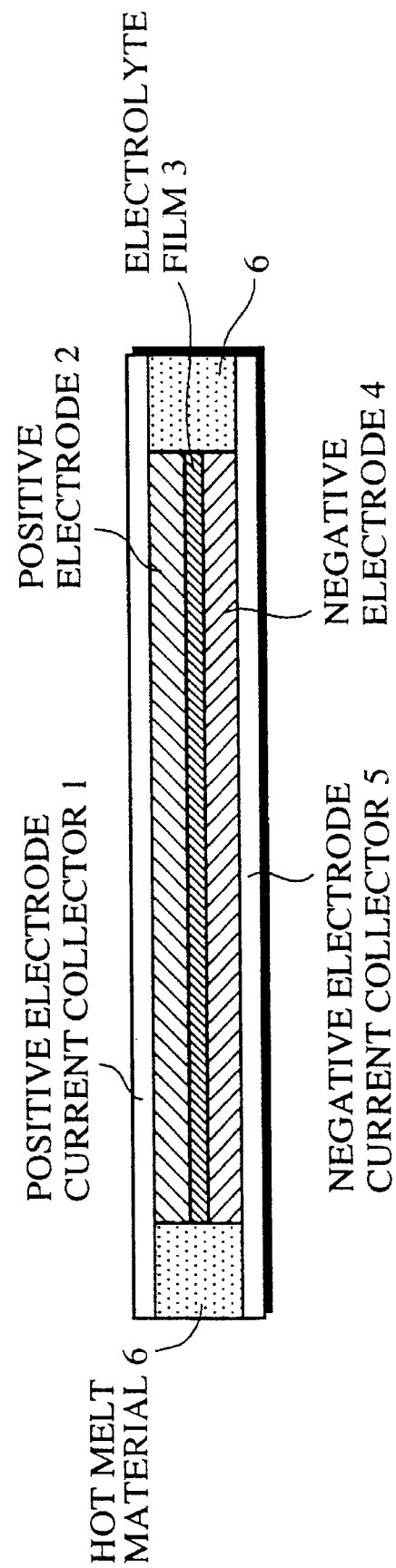
FIG. 1 is a cross-section showing the construction of a polymer solid electrolyte-type lithium secondary cell manufactured using the manufacturing method of the present invention.

The following is an explanation of the main materials used in the manufacturing of the sheet-like composite positive electrode of the present invention.

The polymer solid electrolyte formed from a polymer solid electrolyte precursor has a property of improving the ionic conductivity of the positive electrode, as well as a property of improving the electrical contact between the positive electrode and the polymer solid electrolyte film. Out of the materials in the polymer solid electrolyte, a non-aqueous solvent has the property of improving the electrical contact with the polymer solid electrolyte film, as well as setting an appropriate degree of wetness (viscosity) to the mixture forming the positive electrode during the manufacturing stage of the positive electrode, acting so as to facilitate the arrangement on the current collector and the formation of an expanded sheet. In the same way, the polymer material acts in concert with the electrolyte salt so as to form the polymer solid electrolyte itself, the materials forming the positive electrode being bound together by means of polymerization.

On the other hand, the electrically conductive material, which is not part of the polymer solid electrolyte precursor, acts so as to improve the electrical conductivity of the positive electrode.

In order to improve the performance of the positive electrode, it is necessary for every material in the sheet-like composite positive electrode to act in close relation with each other. In order to achieve this, the electrolyte salt and the polymer material may be in a state where they are dissolved in a non-aqueous solvent and then mixed with the other materials. This is because it is easy to achieve an even mixture using this method by which the electrolyte salt and the polymer material are in a dissolved state before mixing with other materials, with it being possible to form a superior polymer solid electrolyte due to the polymerization and hardening in this state where it is certain that the electrolyte salt and the non-aqueous solvent will be evenly mixed.

The following is a list of non-aqueous solvents in which both the electrolyte salt and the polymer material can be dissolved: ethylene carbonate, propylene carbonate, $\gamma$-butyrolactone, dimethyl carbonate, dimethyl sulfoxide, acetonitrile, sulfolane, dimethylacetamide, 1,2-dimethyoxyethane, 1,2-diethoxyethane, tetrahydrofuran, 2-methyltetrahydrofuran, dioxolane, methyl acetate, ethanol and the like.

A number of substances which have the dual properties of polymerization due to heat or to irradiation by radioactive rays and of being substances which can form the polymer solid electrolyte together with the electrolyte salt may be used as the polymer material. However, it is preferable for such substances not to affect the cell reaction and to be easily polymerized, thereby bonding the other materials firmly by polymerization. Urethane acrylate derivatives and ester acrylate derivatives are examples of such polymer materials. Of these two, ester acrylate derivatives are preferable due to their high electrochemical stability, with polyethylene glycol monoacrylate (see chemical equation 1) which can have a lower alkyl group in an $\alpha$ rank of the acryloyl group, polyethylene glycol diacrylate (see chemical equation 2) which can have a lower alkyl group in an $\alpha$ rank of the acryloyl group, and glycerol tris (acryloyl oxypolyethoxy) ether (see chemical equation 3) which can have a lower alkyl group in an $\alpha$ rank of the acryloyl group, being preferable due to their ionic conductivity and their compatibility with non-aqueous solvents.

CHEMICAL EQUATION 1

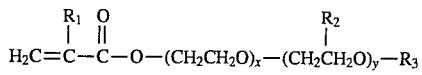

$R_1$, $R_2$, $R_3$ are H or lower alkyl groups where $C \geq 1$ Substances where $x \geq 1$ and $y \geq 0$ are satisfied. Substances where $x \geq 0$ and $y \geq 1$ are satisfied.

CHEMICAL EQUATION 2

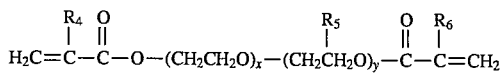

$R_4$, $R_5$, $R_6$ are H or lower alkyl groups where $C \geq 1$ Substances where $x \geq 1$ and $y \geq 0$ are satisfied. Substances where $x \geq 0$ and $y \geq 1$ are satisfied.

CHEMICAL EQUATION 3

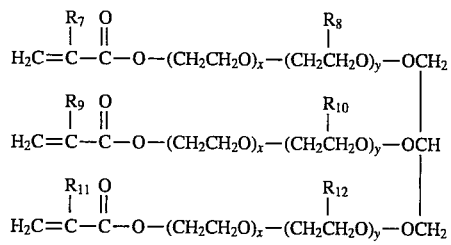

$R_7$, $R_8$, $R_9$, $R_{10}$, $R_{11}$, $R_{12}$ are H or lower alkyl groups where $C \geq 1$ Substances where $x \geq 1$ and $y \geq 0$ are satisfied. Substances where $x \geq 0$ and $y \geq 1$ are satisfied.

These ester acrylate derivatives can be used separately, or alternatively a combination of two or more may be used. Here, it is preferable to have a polymer material which is of low molecular weight and which is in a liquid state at room temperature. This is because substances which are in a liquid state at room temperature can be easily dissolved in non-aqueous solvents and can be used to set an appropriate degree of wetness (viscosity) to a mixture (the mixture forming the positive electrode) when mixed with other substances, thereby facilitating the formation of the expanded sheet.

Regarding the composition of the mixture forming the positive electrode, it is desirable for the polymer material to be within a range of 5%–20% by weight of the mixture forming the positive electrode. If the polymer material is within this range, an adequate bond can be achieved between all of the materials and the polymer material will not quantitatively restrict the combination of the other materials.

It should be noted here that for the present invention, a polymerization accelerant may be added along with the polymer material in order to accelerate the polymerization, with the addition of such a polymerization accelerant facilitating the polymer hardening process. Azobisisobutyronitrile, benzoyl peroxide and benzyldimethyl ketal are all examples of substances which may be used as a polymerization accelerant.

A variety of well-known electrolyte salts, such as $LiClO_4$, $LiBF_4$, $LiBF_6$, $LiAsF_6$, $LiPF_6$, $LiSbF_4$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, or $(C_4H_9)_4NClO_4$. Of these, $LiBF_4$ and $LiBF_6$ are preferable due to their superior stability, low environmental impact, and low cost.

Any material which conducts electricity may be used as the conductive material, but it is preferable to have a material which does not detrimentally affect the cell reaction and which can be mixed evenly into the mixture. Accordingly, it is desireable that a fine powdered conductor such as powdered carbon or powdered metal be used.

The following is an explanation of the separate embodiments of the present invention.

FIRST EMBODIMENT

FIG. 1 is a cross-section showing the construction of an example of a card-shaped polymer solid electrolyte-type lithium secondary cell which is adapted to using the present invention.

The positive electrode current collector 1, the sheet-like composite positive electrode 2, the polymer solid electrolyte film 3, the sheet-like negative electrode 4 and the negative electrode current collector 5 are formed as layers one on top of the other in order, with the power generation elements, made up of the positive electrode 2, the electrolyte film 3 and the negative electrode 4, being disposed between the positive electrode current collector 1 and the negative electrode current collector 5 and being sealed in by the hot melt 6.

The positive electrode current collector 1 and the negative electrode current collector 5 are formed from metal foil such as stainless steel, aluminum or the like.

The sheet-like composite positive electrode 2 is a composite electrode sheet composed of a positive electrode active material, a polymer solid electrolyte and an electrically conductive material. It has contact with the positive electrode current collector 1 on one side and with the polymer solid electrolyte film 3 on the other.

The polymer solid electrolyte film 3 is formed of methoxy polyethylene glycol acrylate, polyethylene glycol dimethacrylate, lithium boron tetrafluoride, propylene carbonate and azobisisobutyronitrile combined at a ratio of 1.5:1.5:1:4:0.05.

The sheet-like negative electrode 4 is made of sheet lithium metal. It is stuck to the negative electrode current collector 5 on one side and is connected the polymer solid electrolyte film 3 on the other.

The hot melt 6 is formed from an insulating polymer which can be melted by the application of heat.

Figure 2:
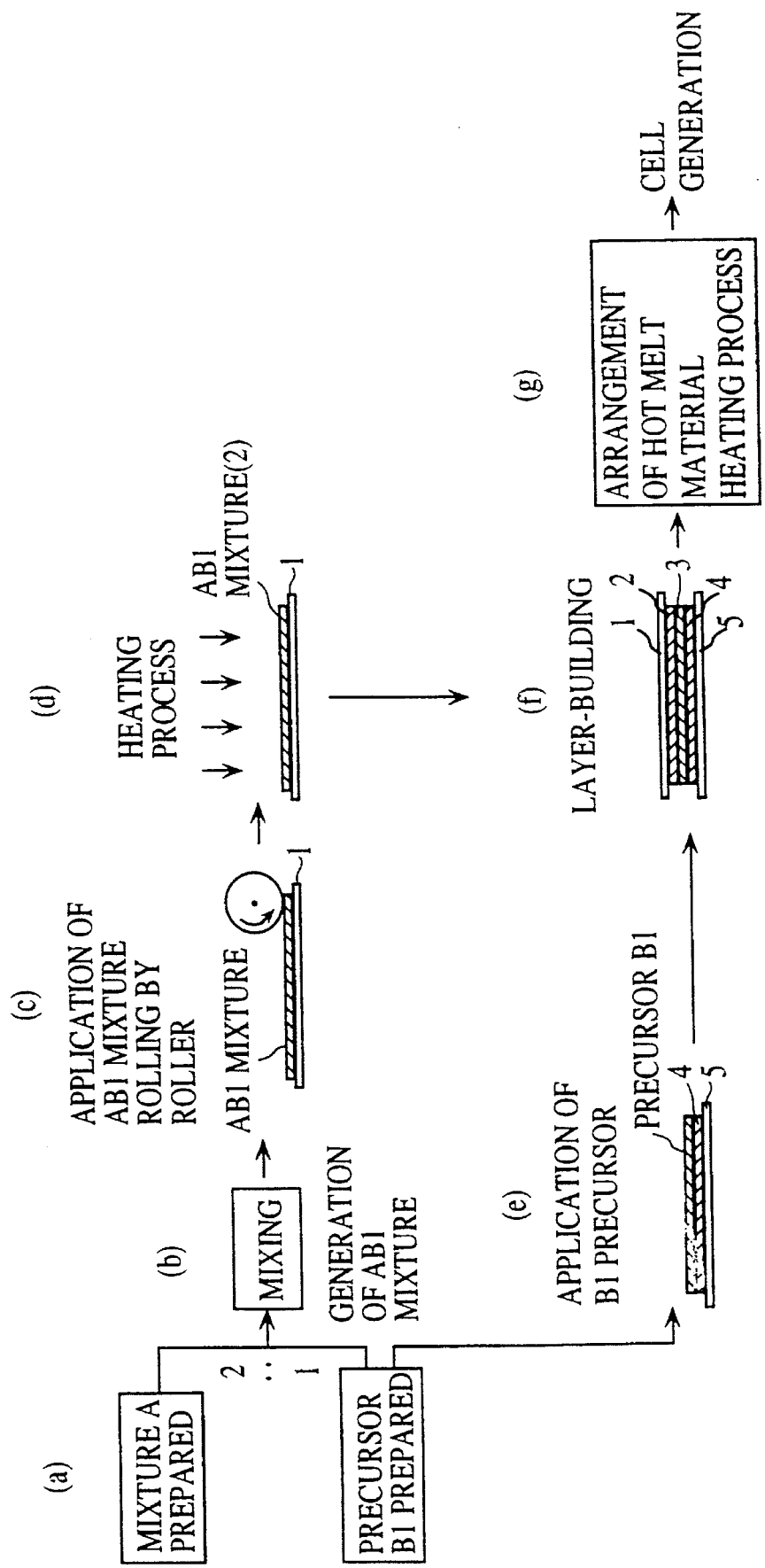
FIG. 2 is a drawing showing the manufacturing process of the cell in the first embodiment.

FIG. 2 is a drawing showing the manufacturing process of the cell in the first embodiment. The following is an explanation of the manufacturing process of the cell in the present embodiment with reference to the drawings.

1. Manufacture of the current-collector single body sheet-like composite positive electrode Firstly, mixed powder A, which is mixture of $LiCoO_2$ and carbon black at a ratio to 85:15 by weight (see Table 1), and polymer solid electrolyte precursor B1, which is a mixture of methoxy polyethylene glycol acrylate of molecular weight 454, polyethylene glycol dimethacrylate of molecular weight 536, lithium boron tetrafluoride, propylene carbonate and azobisisobutyronitrile (polymerization accelerator) combined at a ratio of 1.5:1.5:1:4:0.05 (see Table 2), are manufactured (see FIG. 2(a)).

TABLE 1

| Ratio of composition by weight for mixed powder A | |
|---|---|
| $LiCoO_2$ | 85 |
| carbon black | 15 |

TABLE 2

Ratio of composition by weight
for polymer solid electrolyte precursor B1

| | |
|---|---|
| methoxy polyethylene glycol acrylate (molecular weight 454) | 1.5 |
| polyethylene glycol dimethacrylate (molecular weight 536) | 1.5 |
| $LiBF_4$ | 1 |
| propylene carbonate | 4 |
| azobisisobutyronitrile | 0.05 |

Next, the manufactured mixed powder A and polymer solid electrolyte precursor B1 are mixed at a ratio by weight of 2:1 to form a mortar, thereby manufacturing the mixture AB1 to be used in the formation of the positive electrode (see FIG. 2(b)).

This mixture AB1 is then spread on the positive electrode current collector 1 and, after being expanded into sheet-form by a roller or the like (see FIG. 2(c)), is subjected to a heating process (see FIG. 2(d)). In this way, the polymer material is polymerized by heat and all of the substances in the sheet are combined and bonded to form the sheet-like composite positive electrode, with at the same time this sheet being firmly attached to the current collector so as to become a single body. In this way, the current-collector single body sheet-like composite positive electrode is manufactured.

2. Construction of the cell

The polymer solid electrolyte precursor B1 described above is somewhat excessively spread onto the surface of the negative electrode lithium metal 4 bonded to the negative electrode current collector 5 (see FIG. 2(e)). The current-collector single body sheet-like composite positive electrode described above is then positioned on top of this so that the pair of electrodes face each other and a gap of 25 μm is formed between the surface of the sheet-like composite positive electrode 2 and the surface of the negative electrode lithium metal 4 (see FIG. 2(f)).

The hot melt material 6 is then positioned at the ends of the two stacked electrodes. A heating process is executed raising the temperature of the entire cell to around 100° C. (see FIG. 2(g)). In this way, the polymer solid electrolyte precursor B1 positioned between the sheet-like composite positive electrode 2 and the negative electrode lithium metal 4 is polymerized and hardened to form the polymer solid electrolyte film 3, the surfaces of the polymer solid electrolyte film 3 being simultaneously firmly bonded to the positive electrode and negative electrode, respectively. In the same way, the hot melt material 6 is melted and then hardened so as to seal the power generation elements of the cell.

In this way, the lithium solid electrolyte-type secondary cell to which the present invention relates is manufactured. It should be noted that the thickness of the sheet-like composite positive electrode 2 is around 50 μm and the area of each electrode is around 4 cm². Also, when the polymer solid electrolyte film 3 was placed between sheets of lithium metal and the ionic conductivity was measured using a complex impedance method, the ionic conductivity of the polymer solid electrolyte film 3 was found to be $2.0 \times 10^{-3}$ S/cm.

SECOND EMBODIMENT

This embodiment teaches the manufacture of a lithium solid electrolyte-type secondary cell and is identical to the first embodiment except that the mixed powder A and polymer solid electrolyte precursor B1 are mixed using a weight ratio of 4:1.

THIRD EMBODIMENT

In this embodiment, methoxy polyethylene glycol methacrylate of molecular weight 468, polyethylene glycol trimethacrylate of molecular weight 1484, lithium boron hexafluoride, and propylene carbonate are mixed at a weight ratio of 1.5:1.5:1:4 to give a mixture B2 (see Table 3), and this mixture B2 is then mixed with the aforementioned mixed powder A at a weight ratio of 1:3 (B2:A) so as to produce the mixture AB2 to be used in the formation of the positive electrode.

TABLE 3

Ratio of composition by weight
for polymer solid electrolyte precursor B2

| | |
|---|---|
| methoxy polyethylene glycol methacrylate (molecular weight 468) | 1.5 |
| polyethylene glycol trimethacrylate (molecular weight 1484) | 1.5 |
| $LiBF_6$ | 1 |
| propylene carbonate | 4 |

This embodiment teaches the manufacture of a lithium solid electrolyte-type secondary cell and is identical to the first embodiment except that the mixture AB2 is used for forming the positive electrode, that the mixture B2 is used for forming the polymer solid electrolyte film and that the polymerization of the polymer material is executed by an irradiation method using 12 Mrad of electron rays.

COMPARATIVE EXAMPLE 1

In this example, the aforementioned mixed powder A, the aforementioned polymer solid electrolyte precursor B1 and tetrahydrofuran are stirred and mixed at a weight ratio of 2:1:2.5 so as to form a slurry, with this slurry being applied onto the positive electrode current collector 1 using a doctor blade method. This is then heated, with the heat polymerization of the polymer material in the polymer solid electrolyte precursor B1 creating a sheet-like composite positive electrode-current-collector material wherein the sheet-like composite positive electrode 2 is formed on the positive electrode current collector 1.

The construction of the cell is executed by successively laying first a polymer solid electrolyte film manufactured in a separate process and then a negative electrode-current-collector material wherein lithium metal is attached to a negative electrode current-collector on the sheet-like composite positive electrode-current-collector material described above. In all other aspects, this example is the same as the first embodiment.

COMPARATIVE EXAMPLE 2

This example refers to the manufacture of a lithium solid electrolyte-type secondary cell and is identical to the first embodiment except that the mixed powder A and polymer solid electrolyte precursor B1 are mixed using a weight ratio of 1:2.

However it was found during the formation of the positive electrode that the high flowability of this mixture AB1 caused difficulties in creating a rolled sheet.

COMPARATIVE EXAMPLE 3

This example relates to the mixing of the mixed powder A and polymer solid electrolyte precursor B1 using a weight ratio of 10:1 and then, in the same way as the first embodiment, the application of this mixture onto the positive electrode current collector 1 and its attachment by the application of pressure, such as by rolling.

However for this example it was found during the formation of the positive electrode that the adhesive properties of this mixture AB1 were very poor, so that a sheet was not formed even when it was rolled.

Table 4 shows the composition ratios for the positive electrode mixture and the methods for fabrication in each of the embodiments and comparative examples.

TABLE 4

Composition ratios for the positive electrode mixture in the embodiments (Em.) and comparative examples (C.E)

|  | Em. 1 | Em. 2 | Em. 3 | C.E 1 | C.E 2 | C.E 3 |
| --- | --- | --- | --- | --- | --- | --- |
| mix A | 2 | 4 | 3 | 2 | 1 | 10 |
| mix B1 | 1 | 1 | — | 1 | 2 | 1 |
| mix B2 | — | — | 1 | — | — | — |
| THF | — | — | — | 2.5 | — | — |
| % of polymer material in + electrode forming mix | 12.5% | 7.5% | 9.4% |  | 25% | 3.4% |

Method for fabrication using the positive electrode formation mixture

| Embodiments 1–3 | C.E 1 | C.E 2 | C.E 3 |
| --- | --- | --- | --- |
| Attachment by rolling using a roller | Attachment using a doctor blade method | Attachment by rolling using a roller Difficult to form sheet due to poor viscosity | Cannot be made into a sheet |

CHARGING/DISCHARGING CYCLE TEST

The charging and discharging cycle characteristics for lithium solid electrolyte-type secondary cells for the first, second and third embodiments manufactured according to the methods described above, and for the comparative example 1 were investigated. Charging was executed at 25° C. using a 0.4 mA current until a charging ending voltage of 4.1V was reached, while discharging was executed also at 25° C. using a 0.4 mA current until a discharging ending voltage of 3.0V was reached.

Figure 3:
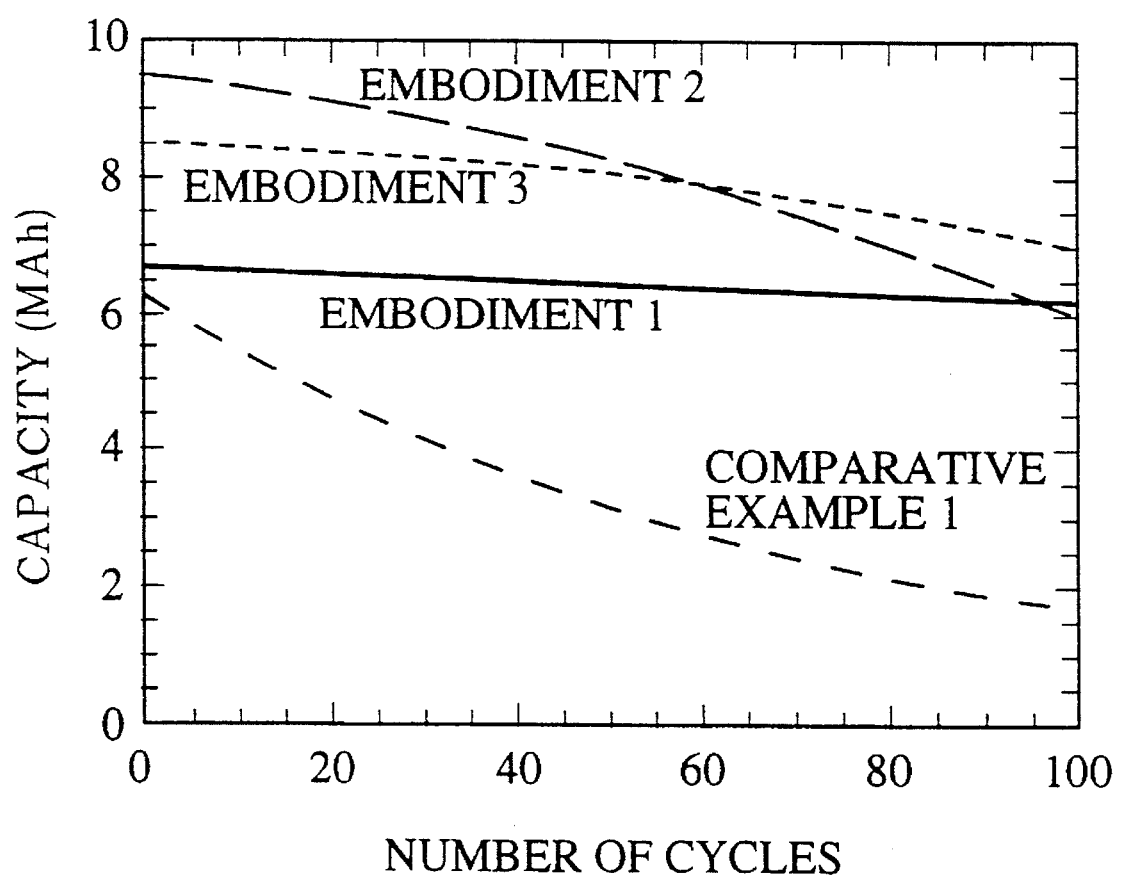
FIG. 3 shows a graph for the cycle characteristics of a polymer solid electrolyte-type lithium secondary cell which is adapted to the present invention and those of a comparative example cell.

FIG. 3 is a graph showing the relation between the number of charging/discharging cycles and cell capacity. As can be clearly seen from FIG. 3, the cells to which the first to third embodiments relate have superior cycle characteristics in comparison with the cell of comparative example 1, with the cycle characteristics of the first and third embodiments being especially good. In addition, the cells of the second and third embodiments have initial cell capacities which are clearly higher than those of the other cells.

Given the above results, the following conclusions can be made.

By comparing the active material arranged in the positive electrodes of the first to third embodiments and of comparative example 1, it can be seen that in terms of the amount of active material second embodiment>third embodiment>first embodiment=comparative example 1. By comparing the amount of electrolyte salt, the order is first embodiment=comparative example 1>third embodiment>second embodiment.

The following is a comparative examination of the first embodiment and comparative example 1, based on the above information. Whilst the initial electric capacity of the first embodiment is the higher, the difference is only slight. This can be thought of as being due to the two cells containing the amount of active material. However regardless of the two cells each having the same amount of active material, a great difference can be seen in the cycle characteristics of the two cells. That is to say, although no great decline in the electric capacity of the cell of the first embodiment can be seen as the number of cycles increases, a large decline in the electric capacity of the cell of the comparative example 1 can be seen as the number of cycles increases. This can be thought of as occurring due to the following reasons.

The positive electrode in comparative example 1 is fabricated using a conventional doctor blade method, with this method referring to the uneven coagulation of all of the materials by means of a process for the evapotranspiration of the solvent (tetrahydrofuran). As a result, the positive electrode in comparative example 1 cannot be formed with a microstructure which promotes the electrochemical reaction in the cell. Also, in comparison with the first embodiment, the electrical connections between the current collector and the positive electrode and between the positive electrode and the polymer solid electrolyte film in the cell in comparative example 1 are poor. This can be considered to be the reason why cell performance declines quickly as the number of cycles increases.

On the other hand, the positive electrode to which the present invention :relates has a favorable microstructure in which all of the materials are evenly distributed, so that the positive interaction between all the materials leads to an effective increase in the area of the positive electrode where the electrochemical :reaction takes place. Furthermore, since there is good electrical contact between all of the materials in the cell manufactured according to the manufacturing method of the present invention (a method in which the electrolyte film and the cell construction are manufactured simultaneously), problems due to poor electrical contact do not arise, even as the number of charging and discharging cycles increases. Accordingly, the cell of the first embodiment can be thought of as having a higher initial cell capacity and as not suffering from a decline in cell capacity due to an increase in the number of cycles.

Next, regarding the differences in the initial capacities and cycle characteristics between the cells to which the first to third embodiments of the present invention relate, these differences can be considered to be mainly caused by the differences in the proportions of active material and electrolyte salt between the different embodiments. That is to say, in the second embodiment, the proportion of the active material is high, with this leading to a corresponding reduction in the proportion of the electrolyte salt (polymer solid-type electrolyte), so that while the initial Dell capacity is higher than those of the first and third embodiments, there is a large decline in cell capacity as the number of cycles increases. Meanwhile, the initial cell capacity and the cycle characteristics of the third embodiment are favorable, and this can be considered as being due to there being a favorable balance of proportions between the active material and the electrolyte salt (polymer solid-type electrolyte). From this, it can be seen that if the manufacturing process of the present invention which sets a favorable balance in the proportion between the active material and the electrolyte salt (polymer solid-type electrolyte) is used, a cell with superior cell capacity and cycle characteristics can be achieved.

The viscosity of the mixture for the formation of the positive electrode can be thought of as being largely determined by the proportion of the polymer material in the mixture, although it was found that for comparative example 2 (proportion of the polymer material in the mixture for the formation of the positive electrode: 25% by weight) and comparative example 3 (proportion 3.4% by weight), it is difficult to form a rolled sheet of the mixture for the formation of the positive electrode on the current collector due to the insufficient viscosity of the mixture and the like. From this, it can be seen that a range of 5%–20% by weight for the proportion of the polymer material in the mixture for the formation of the positive electrode is appropriate.

As described above, the manufacturing method of the present invention, wherein once the mixture for the formation of the positive electrode which includes the polymer material has been rolled onto the current collector, the polymer material is polymerized using heat or ionizing radiation so as to form the current-collector single body sheet-like composite positive electrode, can be clearly seen to be vastly superior to conventional manufacturing methods with regard to the performance of a polymer solid-electrolyte type cell and especially with regard to the cycle characteristics of the cell.

It should be noted here that although the first embodiment was described as using methoxy polyethylene glycol acrylate and polyethylene glycol dimethacrylate as polymer materials and azobisisobutyronitrile as the polymerization accelerator, and the third embodiment was described as using methoxy polyethylene glycol methacrylate and polyethylene glycol trimethacrylate as polymer materials, it should be obvious that other polymer materials can also be used. As examples of such other polymer materials, polyethylene glycol diacrylate, methoxy polyethylene glycol urethane acrylate and the like may also be used. The first embodiment (FIG. 1) was also described as relating to card-shaped lithium secondary cell, although it should also be obvious that the present invention is not limited to this application and so can also be adapted to coin-shaped, cylinder-shaped, square-shaped or other kinds of solid electrolyte-type cells. It is also possible to construct a solid electrolyte-type cell with a spiral construction by rolling, once the sheet-like composite positive electrode and the like have been formed on a flat current collector.

EFFECT OF THE INVENTION

As described above, a sheet-like composite positive electrode with a favorable electrode microstructure wherein all of the materials are evenly distributed can be achieved by means of the manufacturing method of the present invention, while at the same time the sheet-like composite positive electrode having this favorable microstructure can be firmly attached to a current collector so as form a single body. In this kind of current-collector single body sheet-like composite positive electrode, all of the materials in the positive electrode act in concert with one another, which increases the reactive surface area of the electrode. In addition, a favorable electrical connection is made between the current collector and the positive electrode, thereby improving the performance of the electrode.

In the same way, since the manufacturing method of a polymer solid electrolyte-type cell taught by the present invention is a method for manufacturing a polymer solid electrolyte film at the same time as assembling a cell, this leads to an improvement particularly in the processes for the assembly of the cell. Also, since cells manufactured according to this method have a favorable electrical contact between the polymer solid electrolyte and surfaces of both electrodes, this results in a smooth flow of ions and electrons between the two electrodes which, when coupled with the aforementioned effects due to the microstructure, means that a cell with high cell capacity and superior cycle characteristics can be achieved.

Finally, for the manufacturing method of the present invention, since the formation of the sheet-like composite positive electrode and its attachment to the current collector are performed simultaneously with the formation of the polymer solid electrolyte film and the assembly of the cell also being performed simultaneously, this means the entire cell can be manufactured very efficiently indeed. Accordingly, using the present invention, a high performance polymer solid electrolyte cell can be achieved at low cost.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A manufacturing method for a current collector single body sheet-like composite positive electrode where a sheet-like composite positive electrode, including a positive electrode active material, is formed on a positive electrode current collector and constitutes a single body with the positive electrode current collector, said method comprising:

generation of positive electrode mixture process for generating a positive electrode mixture by mixing a non-aqueous solvent, polymer material, an electrolyte salt, the positive electrode active material and an electrically conductive material;

expanded sheet conversion process for expanding the positive electrode mixture after the generated positive electrode mixture has been applied onto the positive electrode current collector; and hardening/attachment process for hardening a sheet-like composite positive electrode and attaching the sheet-like composite positive electrode to the positive electrode current collector by polymerizing the polymer material distributed in the generated sheet-like positive electrode mixture by applying one of heat and ionizing radiation to the sheet-like positive electrode mixture.

2. The manufacturing method of claim 1, wherein the polymer material used in the generation of positive electrode mixture process is an ester acrylate derivative.

3. The manufacturing method of claim 2, wherein during the generation of positive electrode mixture process, a proportion of the polymer material falls within a range of 5% to 20% by weight of the mixture.

4. The manufacturing method of claim 2, wherein the ester acrylate derivative used in the generation of positive electrode mixture process is at least one of:

polyethylene glycol monoacrylate which can have a lower alkyl group in an α rank of the acryloyl group, polyethylene glycol diacrylate which can have a lower alkyl group in an α rank of the acryloyl group, and glycerol tris ether which can have a lower alkyl group in an α rank of the acryloyl group.

5. The manufacturing method of claim 4, wherein during the generation of positive electrode mixture process, a proportion of the polymer material falls within a range of 5% to 20% by weight of the mixture.

6. The manufacturing method of claim 1, wherein the generation of positive electrode mixture process includes the following steps:

a step for manufacturing a polymer solid electrolyte precursor formed by dissolving the polymer material and the electrolyte salt in the non-aqueous solvent, and a step for mixing the manufactured polymer solid electrolyte precursor with the positive electrode active material and the electrically conductive material.

7. The manufacturing method of claim 6, wherein the polymer material used in the generation of positive electrode mixture process is an ester acrylate derivative.

8. The manufacturing method of claim 7, wherein during the generation of positive electrode mixture process, a proportion of the polymer material falls within a range of 5% to 20% by weight of the mixture.

9. The manufacturing method of claim 6, wherein the ester acrylate derivative used in the generation of positive electrode mixture process is at least one of:

polyethylene glycol monoacrylate which can have a lower alkyl group in an α rank of the acryloyl group, polyethylene glycol diacrylate which can have a lower alkyl group in an α rank of the acryloyl group, and glycerol tris ether which can have a lower alkyl group in an α rank of the acryloyl group.

10. The manufacturing method of claim 9, wherein during the generation of positive electrode mixture process, a proportion of the polymer material falls within a range of 5% to 20% by weight of the mixture.

11. A manufacturing method for a polymer solid electrolyte cell constructed from a sheet-like composite positive electrode, a sheet-like negative electrode, a current-collector and a polymer solid electrolyte film disposed between the positive electrode and negative electrode, said method comprising:

expanded sheet conversion process for arranging a positive electrode formation mixture, including a positive electrode active material, an electrically conductive material and a polymer solid electrolyte precursor made up of a non-aqueous solvent, a polymer material and an electrolyte salt, on a positive electrode current carrying board and converting said mixture into a sheet-like mixture by applying pressure;

hardening/attachment process for hardening the sheet-like mixture and attaching the sheet-like mixture to the positive electrode current collector by polymerizing the polymer material distributed in the generated sheet-like mixture by application of one of heat and ionizing radiation;

negative electrode processing process for arranging the polymer solid electrolyte precursor made up of the non-aqueous solvent, the polymer material and the electrolyte salt on a surface of the sheet-like negative electrode;

electrode layer-building process for arranging a current collector single body sheet-like composite positive electrode manufactured in the hardening/attachment process on top of the polymer solid electrolyte precursor arranged on the surface of the sheet-like negative electrode so that the positive electrode and negative electrode face each other with a layer of the polymer solid electrolyte precursor in-between; and cell assembly process for hardening the polymer solid electrolyte precursor to form a polymer solid electrolyte film, attaching the polymer solid electrolyte film to the positive electrode by polymerizing the polymer solid electrolyte precursor by applying one of heat and ionizing radiation to the layer of the polymer solid electrolyte precursor in a layer-built electrode structure manufactured in the electrode layer-building process.

12. The manufacturing process of claim 11, wherein the polymer material used in the expanded sheet conversion process is an ester acrylate derivative.

13. The manufacturing process of claim 12, wherein during the expanded sheet conversion process, a proportion of the polymer material falls within a range of 5% to 20% by weight of the mixture.

14. The manufacturing process of claim 12, wherein the ester acrylate derivative used in expanded sheet conversion process is at least one of:

polyethylene glycol monoacrylate which can have a lower alkyl group in an α rank of the acryloyl group, polyethylene glycol diacrylate which can have a lower alkyl group in an α rank of the acryloyl group, and glycerol tris ether which can have a lower alkyl group in an α rank of the acryloyl group.

15. The manufacturing process of claim 14, wherein during the expanded sheet conversion process, a proportion of the polymer material falls within a range of 5% to 20% by weight of the mixture.

\* \* \* \* \*